US005337927A

United States Patent [19]

de Laforcade

[11] Patent Number: 5,337,927

[45] Date of Patent: Aug. 16, 1994

[54] PUSH-BUTTON ACTUATING MEMBER FOR A LIQUID DISPENSER

[75] Inventor: Vincent de Laforcade, Clamart, France

[73] Assignee: L'Oreal, Paris, France

[21] Appl. No.: 76,791

[22] Filed: Jun. 15, 1993

[30] Foreign Application Priority Data

Jun. 16, 1992 [FR] France ................................ 92 07259

[51] Int. Cl.[5] .............................................. G01F 11/02

[52] U.S. Cl. ................................ 222/321; 222/402.13

[58] Field of Search .................... 222/321, 472, 402.13, 222/402.15, 470, 473, 474, 402.1

[56] References Cited

U.S. PATENT DOCUMENTS

| | | | |
|---|---|---|---|
| 3,149,761 | 9/1964 | Harris et al. | 222/402.15 X |
| 3,478,938 | 11/1969 | Krause | 222/402.15 X |
| 4,124,148 | 11/1978 | Vieler et al. | 222/402.15 X |
| 4,186,855 | 2/1980 | Edman et al. | 222/472 X |
| 5,242,090 | 9/1993 | Reyss | 222/402.15 X |

FOREIGN PATENT DOCUMENTS

| | | | |
|---|---|---|---|
| 702344 | 1/1965 | Canada | 222/402.13 |
| 2398196 | 2/1979 | France | 222/402.13 |

*Primary Examiner*—Kevin P. Shaver
*Attorney, Agent, or Firm*—Staas & Halsey

[57] ABSTRACT

Dispenser for a liquid product, including a container provided at an upper part thereof with a dispensing member carrying a push-button movable button rest and depressed positions, a cap provided with an acuating member in the form of a lever hinged on the cap and provided with a pressing member for acting on an upper outer surface of the push-button. The hinge is connected to the cap about halfway along the movement of the push-button between the rest and depressed positions. The upper outer surface of the push-button is convex and the pressing member defines a bearing surface for receiving the upper outer surface of the push-button.

17 Claims, 2 Drawing Sheets

PUSH-BUTTON ACTUATING MEMBER FOR A LIQUID DISPENSER

BACKGROUND OF THE INVENTION

1. Field of the Invention

The invention relates to a device for dispensing a liquid product.

2. Description of the Related Art

The device includes a container provided in its upper part with a dispensing member carrying a push-button, depression of which actuates the dispensing member, and a cap covering the dispensing member and the container, the cap being provided with an actuating member in the form of a lever hinged on to the front of the cap, and having a pressing means for acting on the push-button when pressure is applied to the rear part of the lever, the push-button being situated between the hinge and the rear part of the lever, and carrying a dispensing nozzle for discharging the product towards the atmosphere.

The invention relates equally to a device in which the push-button forms the actuating element of a pump mounted on the upper part of the container which is not pressurized when the pump is not actuated, and to a device in which the container is pressurized, depression of the push-button then resulting in the opening of a valve.

French Patent Application No. 91 04852 filed on Apr. 19, 1991 in the name of the Applicant and EP-A1-0 402 636 show a device for dispensing a liquid product contained in a container, comprising a cap with an actuating member in the form of a lever for depressing a push-button.

In order to minimize the deformation of the dispensing member during its movement during the operation of the lever, in particular the deformation of the emergent stem of a dispensing pump, it is necessary for the axis of rotation of the operating lever to be situated axially at the top at a right angle half-way up the stroke of the push-button. Lowering the axis of rotation of the lever of the devices according to FR-91 04852 and EP-A1-0 402 636 leads to friction and stresses on the push-button which do not promote either very good efficiency or very good operation of the operating lever.

This invention relates to a dispenser for a liquid adapted so as to minimize the disadvantages described hereinabove.

SUMMARY OF THE INVENTION

The present invention provides a dispenser for a liquid product, comprising a container provided in its upper part with a dispensing member carrying a push-button, depression of which actuates the dispensing member, a cap covering the dispensing member and the container, the cap being provided with an actuating member in the form of a lever hinged on to the cap and provided with pressing means for acting on the upper outer surface of the push-button which carries a dispensing nozzle for discharging the product towards the atmosphere. The hinge between the actuating member and the cap is situated at the top at a right angle half-way up the stroke of the push-button, the upper outer surface of the push-button is a convex spherical surface and the pressing means defines a spherical bearing surface complementary to that of the upper outer surface of the push-button. The pressing means consists of at least two circular segments centered on the axis of the push-button when the actuating member is at rest, the two segments being diametrically opposite relative to the axis. The pressing means preferably consists of a circular ring.

According to one embodiment, the axis of the dispensing nozzle is perpendicular to the longitudinal axis of the device along which the push-button is depressed.

The actuating member is advantageously in the shape of a right dihedron, the upper face of which is horizontal when the container is vertical, and has a vertical rear face, the upper face being extended at the front by a vertical downward extension at the lower end of which the hinge is provided.

The upper face of the lever is flat and carries the pressing means, preferably in the form of a circular ring. The pressing means is positioned in such a manner that when the lever is in the position in which it is depressed to its maximum extent corresponding to the position in which the push-button is depressed to its maximum extent, the pressing means cooperates with the upper part of the push-button along at least a zone situated on the side of the hinge of the lever, and in any case to the maximum along the axis of the push-button.

The upper and rear faces are limited by walls, themselves limited by an edge in the shape of a circular arc. A notch is formed on the vertical return of the lever and is traversed by the nozzle.

The hinge is advantageously a film hinge connecting the actuating member and the cap. The cap is provided on its front wall with a notch for the passage of the nozzle.

Guide means is preferably provided for guiding the actuating member relative to the dispensing member. The guide means consists of the edges of the notch which cooperate with the dispensing nozzle. The guide means consists of a groove provided in the vertical center plane in the push-button, a projection formed on the inner surface of the upper face of the lever engaging in the groove. The guide means consists of two flat parts provided on the upper spherical part of the push-button parallel to the vertical center plane of the push-button and cooperating with flat faces carried by diametrically opposing extensions of the ring.

BRIEF DESCRIPTION OF THE DRAWINGS

The objects of the invention will be more readily understood from the following description of several embodiments given purely by way of non-limiting examples and with reference to the accompanying drawings, in which.

DESCRIPTION OF THE PREFERRED EMBODIMENTS

Figure 1:
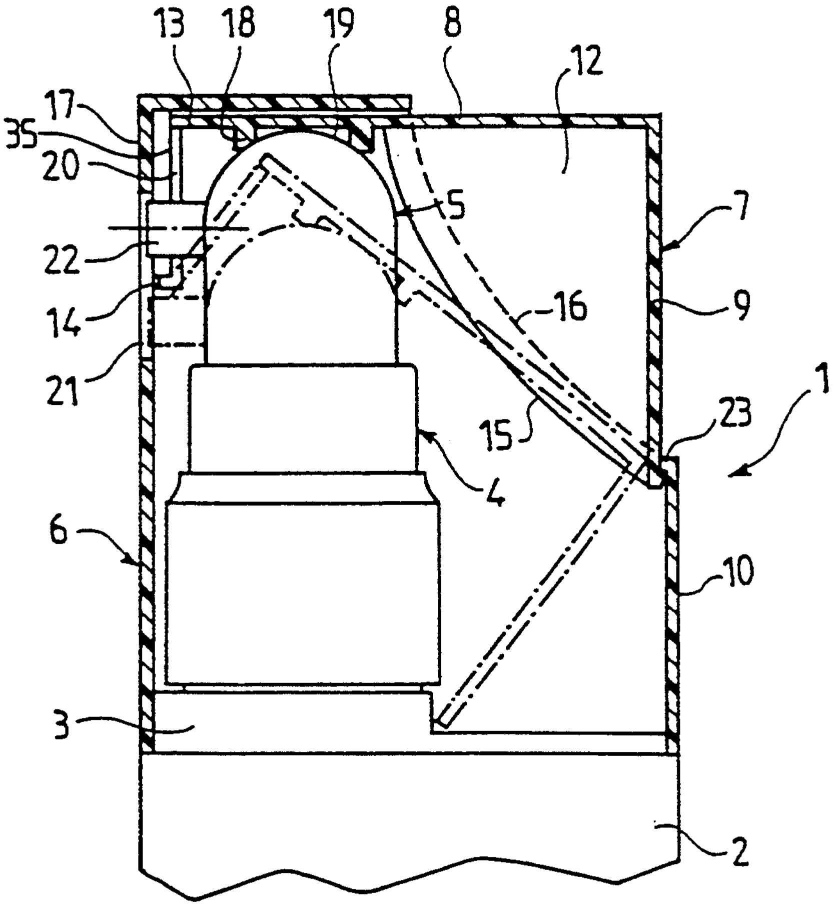
FIG. 1 is a partial section of a dispenser for a liquid product according to the invention.

Referring to FIG. 1, a dispenser 1, e.g. for dispensing a liquid product in fine droplets, comprises a container 2 or bottle containing the liquid to be dispensed. The container 2 can be of any shape, e.g. circular or asymmetrical, and in particular an elliptical or elongated shape.

The container 2 is provided at an upper part thereof with a dispensing pump 4, in the example shown, carried by a lid 3 closing the container 2, as known per se. The pump 4 is actuated by a push-button 5, depression of which results in the discharge of the atomized liquid through a nozzle 22 having a horizontal axis perpendicular to the longitudinal axis of the device 1, depression being effected along this longitudinal axis.

The device comprises a cap 6 capable of covering the container 2 and the dispensing pump 4, and being adapted to the contour of the lid 3.

The cap 6 is provided with an actuating member for the push-button 5. This actuating member consists of a lever 7 generally in the shape of a right dihedron, the upper face 8 of which is horizontal when the container 2 is vertical, and has a vertical rear face 9. The upper face 8 is flat and is extended at the front by a vertical return 35 in which a notch 20 traversed by the nozzle 22 is formed. The substantially cylindrical rear face 9 is inscribed within the inner contour of the rear face 10 of the cap, itself similar to the rear face of the container 2.

The faces 8 and 9 of the lever are limited laterally by walls, such as the walls 12 which can be seen in FIG. 1, substantially tangential internally to the lateral walls of the cap 6. The walls 12 extend as far as the lower edge of the rear face 9 and stop at a certain distance behind the front edge 13 of the upper face 8. These lateral walls 12 are limited by an edge 15 in the shape of a circular arc.

The cap 6 is provided in its rear part towards the top with a notch limited by a contour 16 substantially in the shape of a circular arc, situated slightly above the edge 15 of the arms 12 of the lever 7 when the lever 7 is in the rest position. This notch allows the greater part of the lever 7 to be left visible, completing the contour of the cap 6 at right angles with this notch.

The lever 7 is hinged at the lower end of the return 35 situated in front of the lever to the front wall 17 of the cap 6, by means of a film hinge 14. The front wall 17 of the cap 6 also carries a notch 21 for the passage of the nozzle 22. The notch 21 and the notch 20 formed in the return 35 of the lever have a sufficient axial length to allow the nozzle 22 clearance therein, irrespective of the vertical position of the push-button 5.

The lever 7 is provided on its upper face 8 with pressing means for acting on the push-button 5. The pressing means consists of a circular ring 18 centered on the axis of the push-button 5 when the lever 7 is at rest. The upper part 19 of the push-button 5 is a convex spherical surface, the lower annular end of the ring 18 defining a spherical bearing surface complementary to that of the upper part 19 of the push-button 5. The diameter of the ring 18 is such that when the lever 7 is in the position in which it is depressed to its maximum extent, corresponding to the position in which the push-button 5 is depressed to its maximum extent, the ring 18 cooperates with the upper part 19 of the push-button along at least a zone situated on the side of the film hinge 14 of the lever, and in any case to the maximum along the axis of the push-button 5. By virtue of this arrangement, the combined action of the rotation of the lever 7 about the film hinge 14 and the downward displacement of the push-button 5 ensures that the resultant of the forces applied to the push-button 5 remains substantially in the axis of the pump 4 during the entire time that the lever 7 is acted upon in order to dispense the liquid contained in the container 2.

The small overall height of the device according to the invention compared to those of the prior art will also be noted. This is due, on the one hand, to the small axial dimensions of the ring 18 and, on the other hand, to the low position of the film hinge 14 at the lower end of the front wall 20 of the lever 7.

The cap 6 comprises at the rear a coupling means for the rear part of the lever 7 in order to hold the lever 7 in the rest position. This coupling means consists of a catch 23 provided in the upper part of the rear wall 10 of the cap 6 capable of cooperating with a corresponding edge provided on the lower edge of the rear face 9 of the lever 7.

Figure 1A:
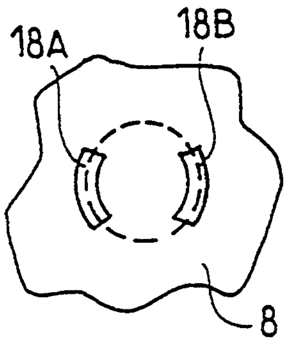
FIG. 1A is a partial bottom view of the upper face 8 of the actuating member 7 showing a variant of the pressing means 18.

FIG. 1A shows a variant of the pressing means. According to this figure, the circular ring 18 described with reference to FIG. 1 is replaced by two diametrically opposing circular segments 18A, 18B.

Guide means are provided to position the assembly formed by the cap and the lever relative to the nozzle 22 received in the notches 20 and 21 and to guide the lever 7 during its displacement.

Figure 2:
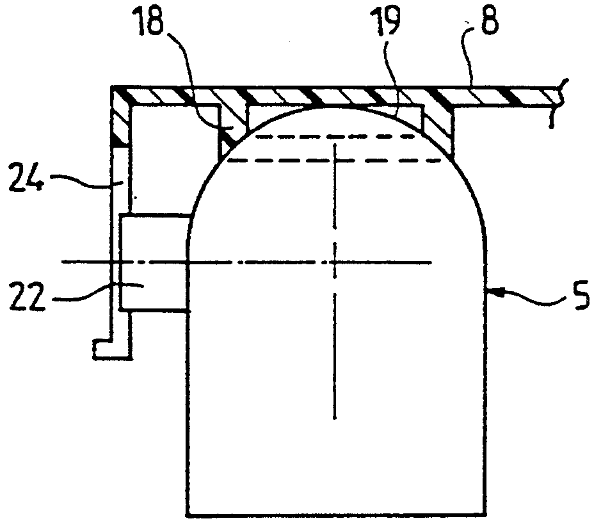
FIG. 2 is a partial view of the device of FIG. 1 showing a first variant of the guide means.
Figure 2A:
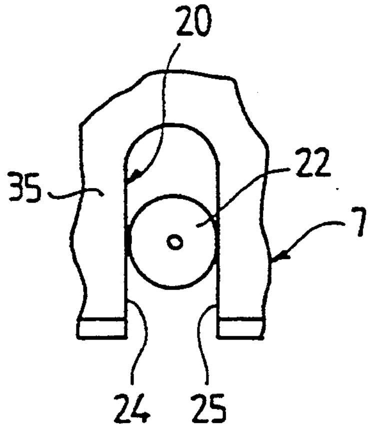
FIG. 2A is a partial left-hand view of FIG. 2.

According to the variant of FIGS. 2 and 2A, these guide means consist of the edges 24 and 25 of the notch 20 provided on the front return 35 of the lever 7. The edges 24 and 25 are parallel to the longitudinal axis of the device and are spaced apart by a value equal to the diameter of the horizontal cylindrical nozzle 22 having a circular section.

Figure 3:
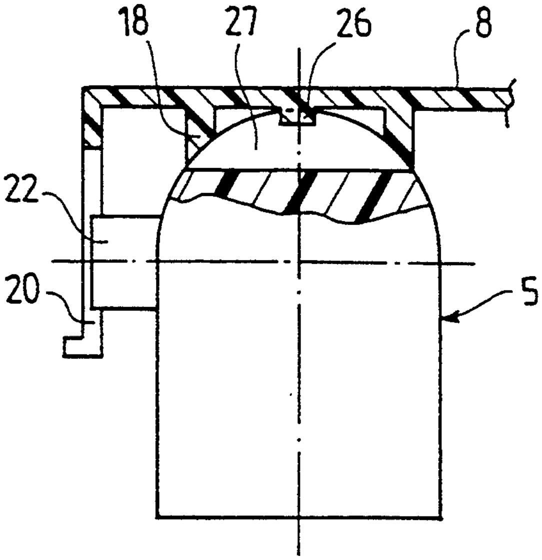
FIG. 3 is a partial view of the device of FIG. 1 showing a second variant of the guide means.
Figure 3A:
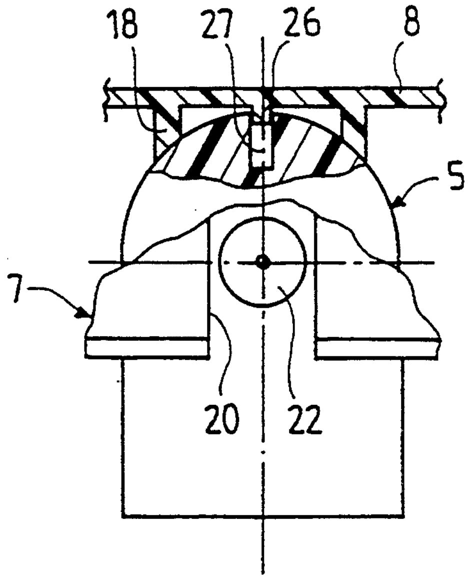
FIG. 3A is a partial left-hand view of FIG. 3.

According to the variant of FIGS. 3 and 3A, the anti-rotation guide means consists of a groove 27 provided in the vertical center plane in the push-button 5. A projection 26 formed on the inner surface of the upper face 8 of the lever 7 engages in the groove 27. The thickness of the projection 26 is equal to the width of the groove 27.

Figure 4:
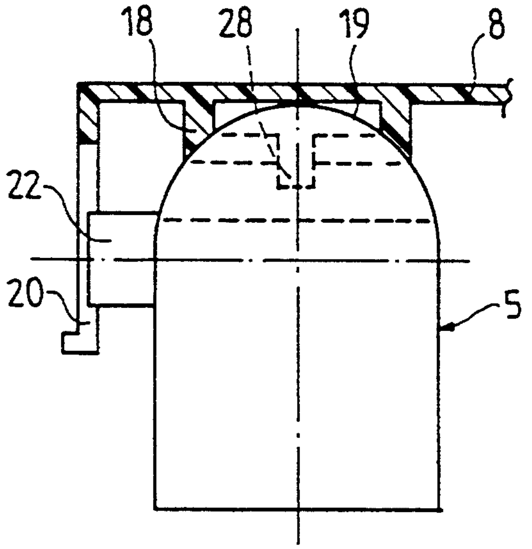
FIG. 4 is a partial view of the device of FIG. 1 showing a third variant of the guide means.
Figure 4A:
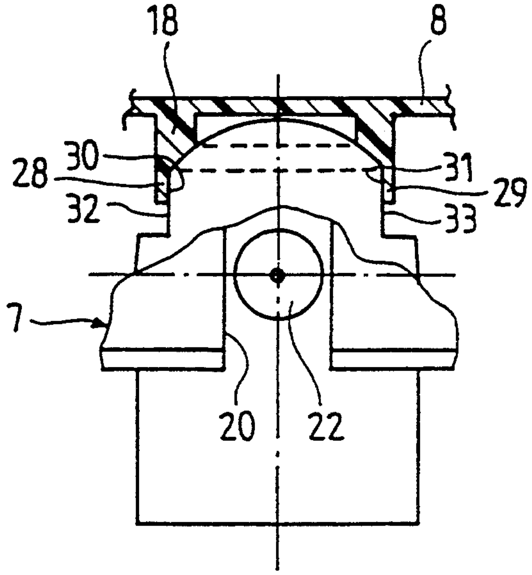
FIG. 4A is a partial left-hand view of FIG. 4.

According to the variant of FIGS. 4 and 4A, the guide means consists of two flat parts 32, 33 provided on the upper spherical part of the push-button 5. The two flat parts 32, 33 are parallel to the vertical center plane of the push-button 5. These two flat parts 32, 33 cooperate respectively with two flat faces 30, 31 carried by diametrically opposing vertical extensions 28, 29 of the ring 18.

I claim:

1. Dispenser for a liquid product, comprising:

a container;

a dispensing member provided at an upper part of the container and carrying a push-button movable along a first axis, between a first, rest position and a second, depressed position, and including a nozzle for dispensing the product, wherein movement of the push-button from the first position to the second position actuates the dispensing member; and a cap covering the push button and the dispensing member, the cap being provided with an actuating member in the form of a lever connected to the cap by a hinge, the lever being movable between a first, rest position and a second, depressed position, and the lever being provided with pressing means for acting on an upper outer surface of the push-button, wherein the hinge between the lever and the cap is situated approximately half-way between the first and second positions of the push-button, wherein the upper outer surface of the push-button is a convex surface, and wherein the pressing means defines a bearing surface for receiving the upper outer surface of the push-button.

2. Dispenser according to claim 1, wherein an axis of the dispensing nozzle, along which the product is discharged, is perpendicular to the first axis.

3. Dispenser according to claims 1 or 2, wherein the actuating member includes an upper face which is substantially horizontal when the container is vertical, and a substantially vertical downward rear face, the upper face including a front thereof to which is attached a vertical downward extension, at a lower end of which the hinge is provided.

4. Dispenser according to claim 3, wherein the upper face is planar and carries the pressing means.

5. Dispenser according to claim 3, wherein a notch is formed on the vertical downward extension, the notch receiving the nozzle therethrough.

6. Dispenser according to claim 3, wherein guide means is provided for guiding the actuating member relative to the push button.

7. Dispenser according to claim 1, wherein a notch is formed on the vertical downward extension to receive the nozzle therethrough, and the guide means comprises edges of the notch which cooperate with the dispensing nozzle.

8. Dispenser according to claim 6, wherein the guide means comprises a groove provided in a vertical plane in the push-button, in which a projection formed on an inner surface of the upper face of the lever engages.

9. Dispenser according to claim 6, wherein the guide means comprises two flat parts provided on the upper outer surface of the push-button, parallel to a vertical center plane of the push-button, and cooperating with flat faces carried by diametrically opposing extensions of the pressing means.

10. Dispenser according to claim 1, wherein, when the lever is moved between the first and second positions, the pressing means cooperates with the upper outer surface of the push-button along at least a zone situated on a side of the hinge of the lever.

11. Dispenser according to claim 1, wherein the pressing means comprises at least two circular segments centered on the first axis, when the actuating member is in the first position, wherein the two circular segments are diametrically opposite relative to the first axis.

12. Dispenser according to claim 1, wherein the hinge is a film hinge connecting the actuating member and the cap.

13. Dispenser according to claim 1, wherein the cap is provided on a front wall thereof with a notch for receiving the nozzle therethrough.

14. Dispenser for a liquid product, comprising:

a container;

a dispensing member provided at an upper part of the container and carrying a push-button movable along a first axis, between a first, rest position and a second, depressed position, and including a nozzle for dispensing the product, wherein movement of the push-button from the first position to the second position actuates the dispensing member; and a cap covering the push button and the dispensing member, the cap being provided with an actuating member in the form of lever connected to the cap by a hinge, the lever being movable between a first, rest position and a second, depressed position, and the lever being provided with a pressing member for acting on an upper outer surface of the push-button, wherein the hinge between the lever and the cap is situated approximately half-way between the first and second positions of the push-button, wherein the upper outer surface of the push-button is a convex surface, and wherein the pressing member defines a bearing surface for receiving the upper outer surface of the push-button.

15. Dispenser according to claim 14, wherein the actuating member includes an upper face which is substantially horizontal when the container is vertical, and a substantially vertical downward rear face, the upper face including a front thereof to which is attached a vertical downward extension, at a lower end of which the hinge is provided.

16. Dispenser according to claim 14, wherein, when the lever is moved between the first and second positions, the pressing member cooperates with the upper outer surface of the push-button along at least a zone situated on a side of the hinge of the lever.

17. Dispenser according to claim 16, wherein a guide is provided for guiding the actuating member relative to the push button.

* * * * *